United States Patent

Chang

[11] Patent Number: 6,053,590
[45] Date of Patent: Apr. 25, 2000

[54] COMPUTER SCANNER CASING

[76] Inventor: Wen-Hsivng Chang, 45, Huan Kung Rd., Yung Kang Industrial Park, Yung Kang, Tainan Hsian, Taiwan

[21] Appl. No.: 09/237,493

[22] Filed: Jan. 25, 1999

[51] Int. Cl.[7] .................................................. A47G 81/00
[52] U.S. Cl. ........................................ 312/284; 312/312
[58] Field of Search .................................. 312/139, 284, 312/312, 334.2, 223.2, 301

[56] References Cited

U.S. PATENT DOCUMENTS

| | | | |
|---|---|---|---|
| 2,850,344 | 9/1958 | Cook | 312/312 |
| 2,866,677 | 12/1958 | Anderson | 312/301 |
| 5,733,021 | 3/1998 | O'Neill et al. | 312/312 |

Primary Examiner—Peter M. Cuomo
Assistant Examiner—Jerry A. Anderson
Attorney, Agent, or Firm—Alan Kamrath; Oppenheimer Wolff & Donnelly LLP

[57] ABSTRACT

A computer scanner casing has a lower housing, an upper housing disposed on the lower housing, and four link devices disposed in the lower housing. Two slide grooves are formed in two laterals of the lower housing. Four annular seats are disposed in four inner corners of the upper housing. Each link device has an oblong hole, a round hole, and a through hole. A pin passes through the round hole to fasten the respective link device on the respective annular seat. A male fastener passes through two oblong holes of two link devices to fasten two link devices together. A female fastener engages with the male fastener. A caster is inserted through the respective through hole. A retainer button engages with the caster. The caster is inserted in the respective slide groove.

1 Claim, 5 Drawing Sheets

COMPUTER SCANNER CASING

BACKGROUND OF THE INVENTION

The present invention relates to a computer scanner casing. More particularly, the present invention relates to a computer scanner casing which provide a three-dimensional casing in order to scan a solid article directly.

Referring to FIG. 5, a conventional computer scanner casing B is disposed on a scanner A. However, a lantern slide cannot be scanned. Since the spacing between the conventional computer scanner casing B and the scanner A is small while the conventional computer scanner casing B covers the scanner A, a solid article cannot be scanned directly.

Referring to FIG. 6, another conventional computer scanner casing C is disposed on a scanner A. The conventional computer scanner casing C has a transparent mask so that a lantern slide can be scanned.

SUMMARY OF THE INVENTION

An object of the present invention is to provide a computer scanner casing which provides a three-dimensional interior in order to scan a solid article directly.

Another object of the present invention is to provide a computer scanner casing which provides an upper housing and a lower housing in order to adjust the height of the computer scanner casing according to the height of the solid article which is placed in the computer scanner casing.

Accordingly, a computer scanner casing comprises a lower housing, an upper housing disposed on the lower housing, and four link devices disposed in the lower housing. Two slide grooves are formed in two laterals of the lower housing. Four annular seats are disposed in four inner corners of the upper housing. Each of the link devices has an oblong hole, a round hole, and a through hole. A pin passes through the round hole to fasten the respective link device on the respective annular seat. A male fastener passes through two oblong holes of two link devices to fasten two link devices together. A female fastener engages with the male fastener. A caster is inserted through the respective through hole. A retainer button engages with the caster. The caster is inserted in the respective slide groove.

DETAILED DESCRIPTION OF THE INVENTION

Figure 1:
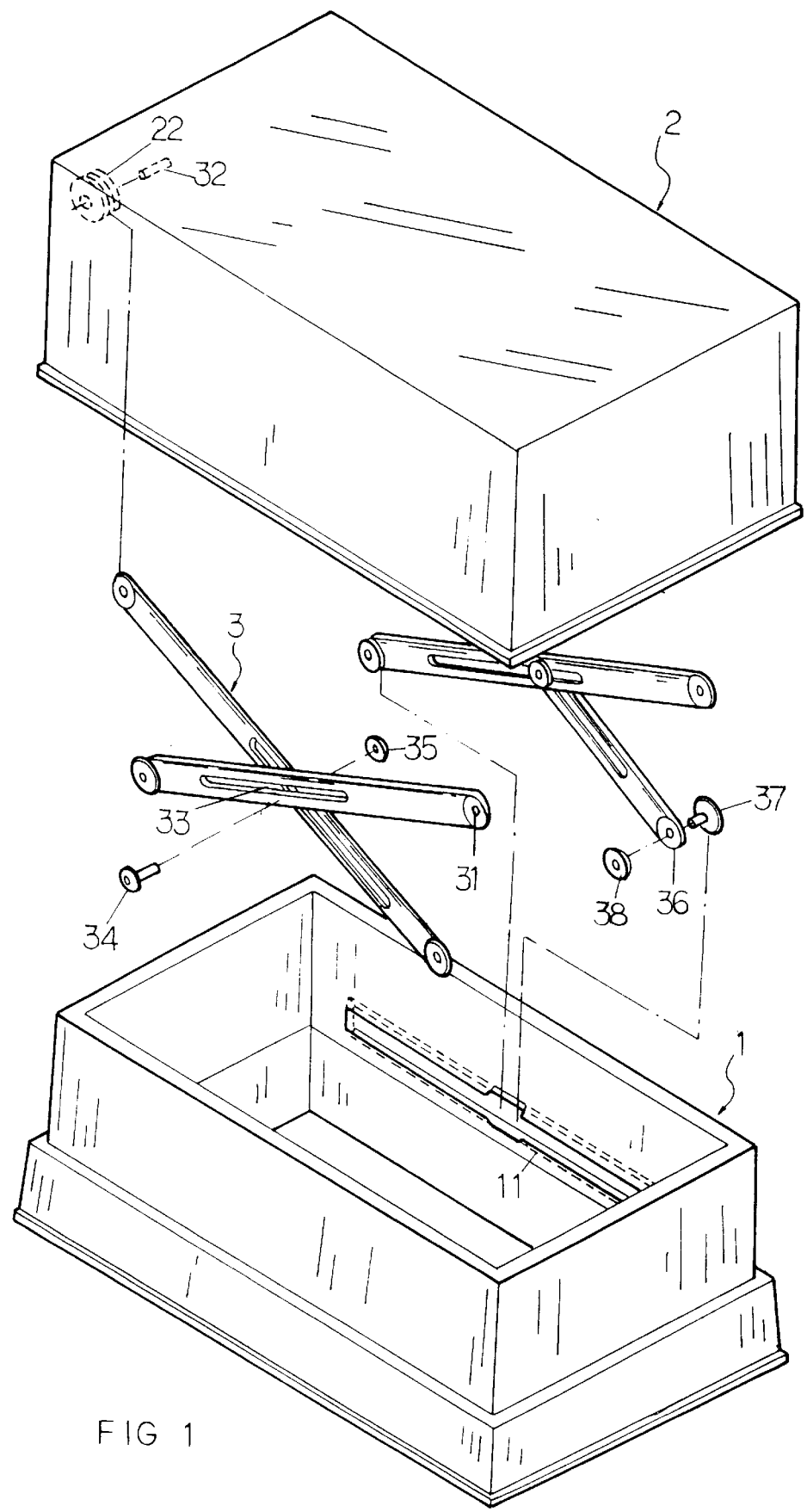
FIG. 1 is a perspective exploded view of a computer scanner casing of a preferred embodiment in accordance with the present invention.
Figure 2:
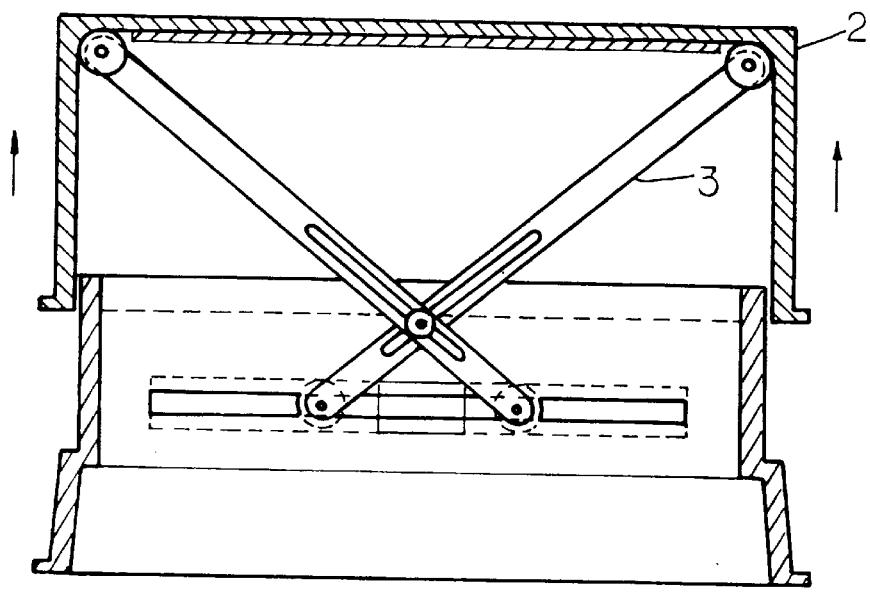
FIG. 2 is a schematic view illustrating an operation of a computer scanner casing of a preferred embodiment in accordance with the present invention.
Figure 3:
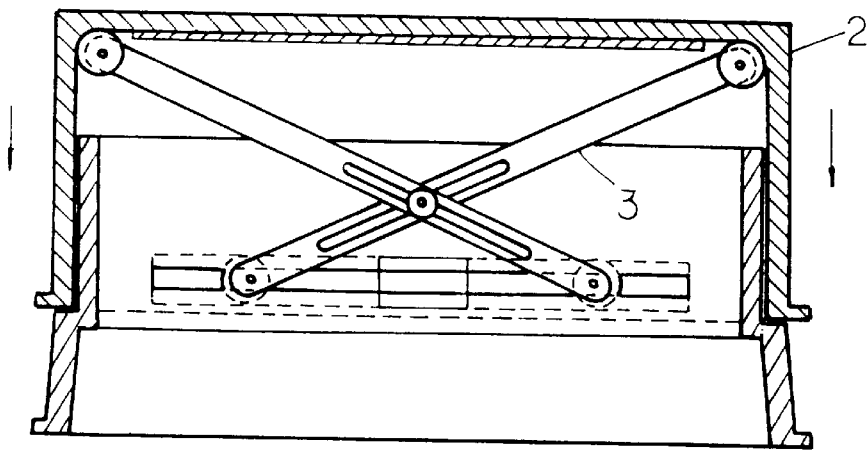
FIG. 3 is another schematic view illustrating an operation of a computer scanner casing of a preferred embodiment in accordance with the present invention.

Referring to FIGS. 1 to 4, a computer scanner casing comprises a lower housing 1, an upper housing 2 disposed on the lower housing 1, and four link devices 3 disposed in the lower housing 1.

Two slide grooves 11 are formed in two laterals of the lower housing 1.

Four annular seats 22 are disposed in four inner corners of the upper housing 2.

Each of the link devices 3 has an oblong hole 33, a round hole 31, and a through hole 36. A pin 32 passes through the round hole 31 to fasten the respective link device 3 on the respective annular seat 22.

A male fastener 34 passes through two oblong holes 33 of two link devices 3 to fasten two link devices 3 together. A female fastener 35 engages with the male fastener 34.

A caster 37 is inserted through the respective through hole 36. A retainer button 38 engages with the caster 37. The caster 37 is inserted in the respective slide groove 11.

A solid article is placed in the lower housing 1. The upper housing 2 covers the lower housing 1.

Referring to FIG. 2 again, the casters 37 move along the slide grooves 11 to lift the upper housing 2 while the solid article is very tall.

Referring to FIG. 3 again, the casters 37 move along the slide grooves 11 to lower the upper housing 2 while the solid article is low.

Figure 4:
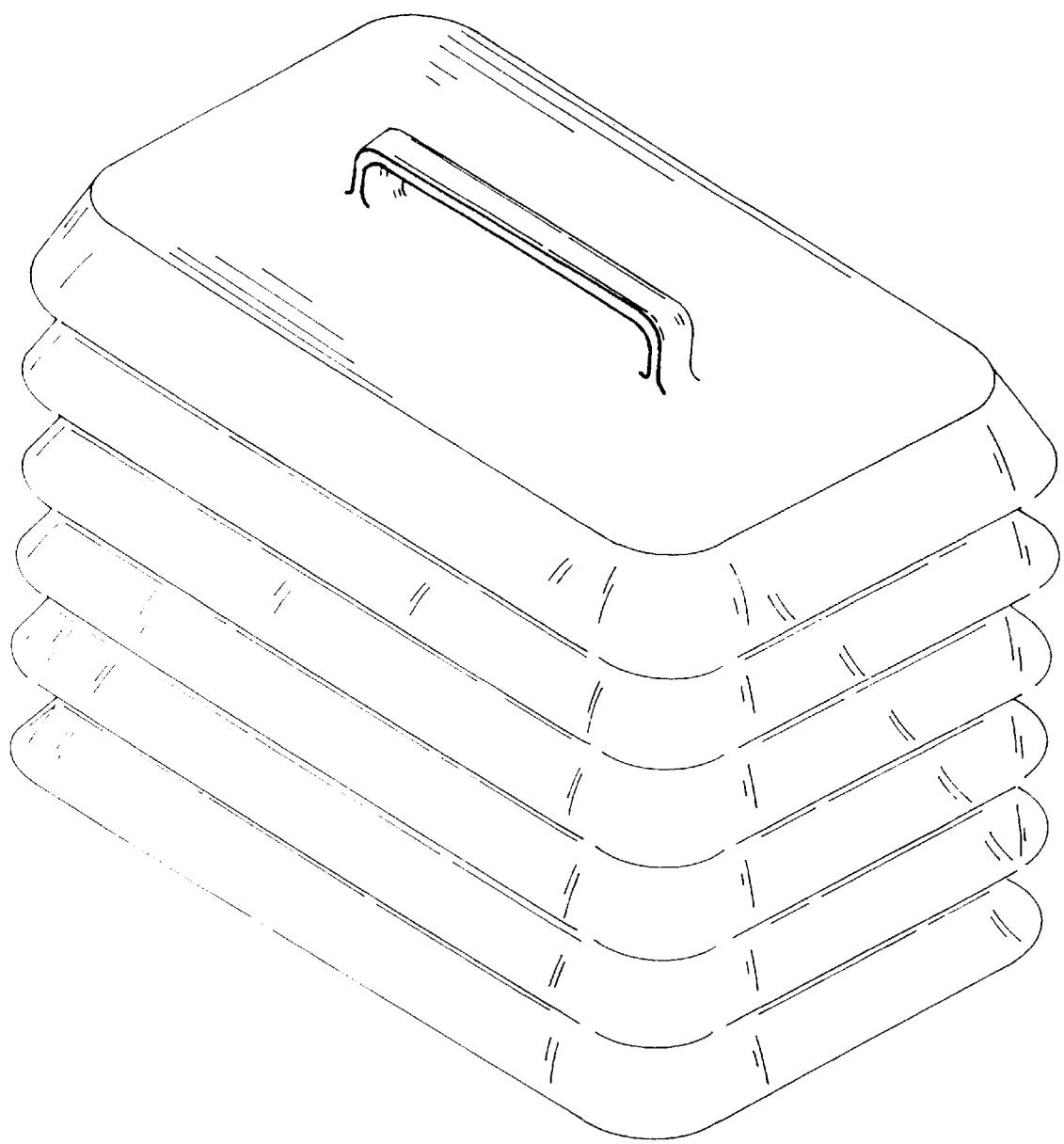
FIG. 4 is a perspective view of a computer scanner casing of another preferred embodiment in accordance with the present invention.
Figure 5:
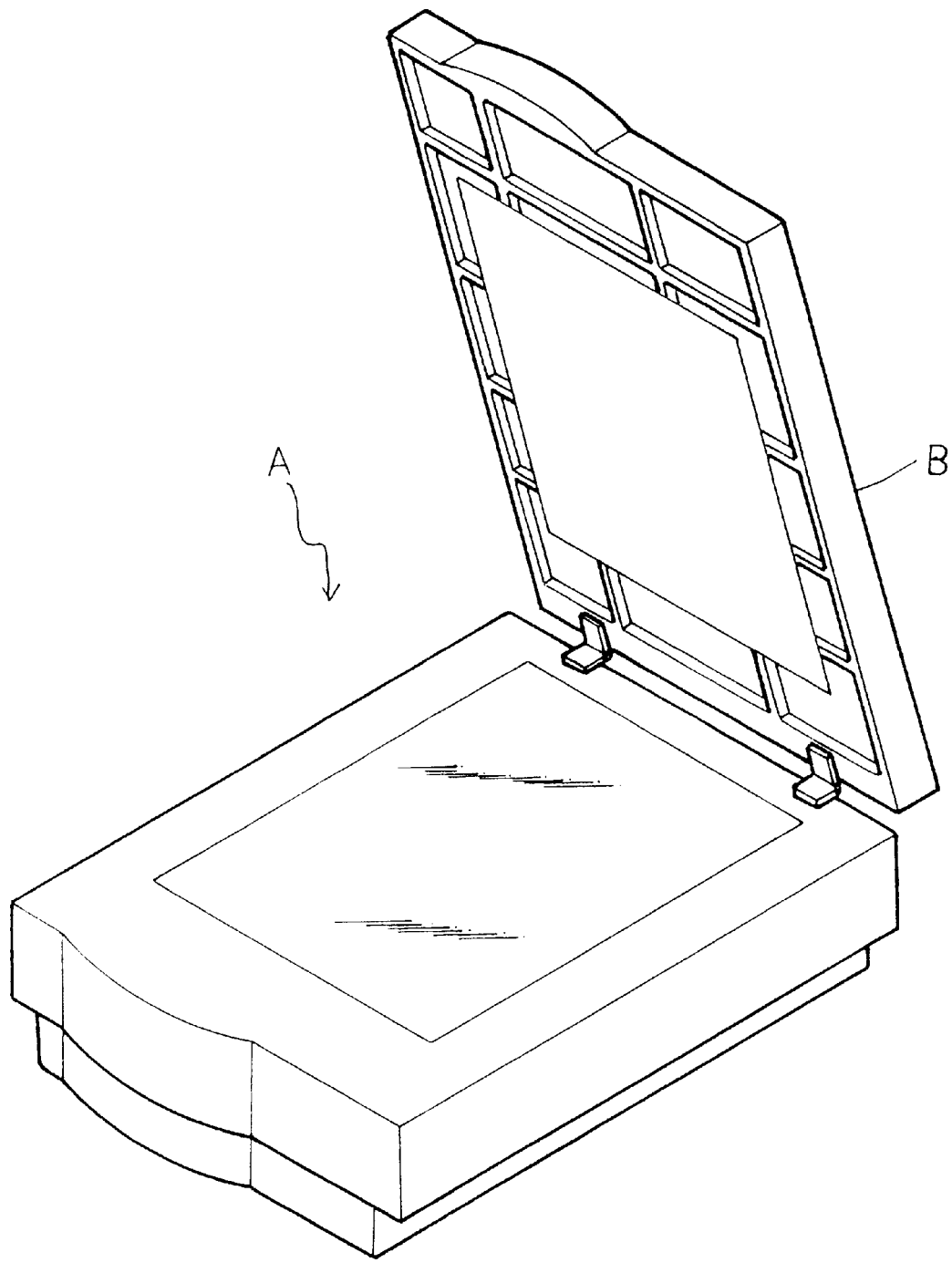
FIG. 5 is a perspective view of a first conventional computer scanner casing of the prior art disposed on a scanner.
Figure 6:
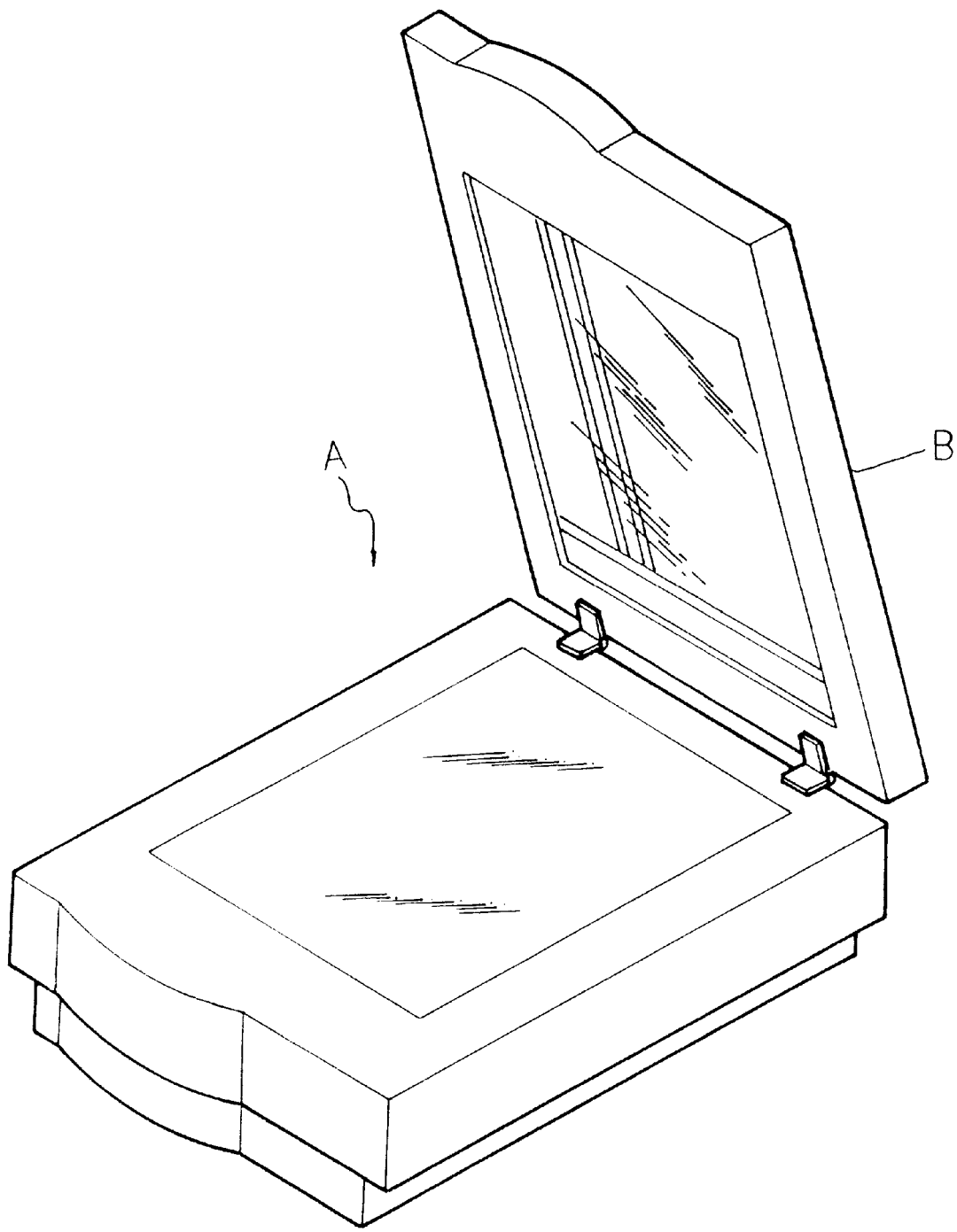
FIG. 6 is a perspective view of a second conventional computer scanner casing of the prior art disposed on a scanner.

Referring to FIG. 4, another computer scanner casing is in a corrugared shape.

The invention is not limited to the above embodiment but various modification thereof may be made. Further, various changes in form and detail may be made without departing from the scope of the invention.

I claim:
1. A computer scanner casing comprises:

a lower housing, an upper housing disposed on the lower housing, four link devices disposed in the lower housing, two slide grooves formed in two laterals of the lower housing, four annular seats disposed in four inner corners of the upper housing, each of the link devices having an oblong hole, a round hole, and a through hole, a pin passing through the round hole to fasten the respective link device on the respective annular seat, a male fastener passing through two oblong holes of two link devices to fasten two link devices together, a female fastener engaging with the male fastener, a caster inserted through the respective through hole, a retainer button engaging with the caster, and the caster inserted in the respective slide groove.

* * * * *